Dec. 14, 1926.
W. GUY-PELL
1,610,370
COOKING APPARATUS
Filed August 8, 1925      3 Sheets-Sheet 1
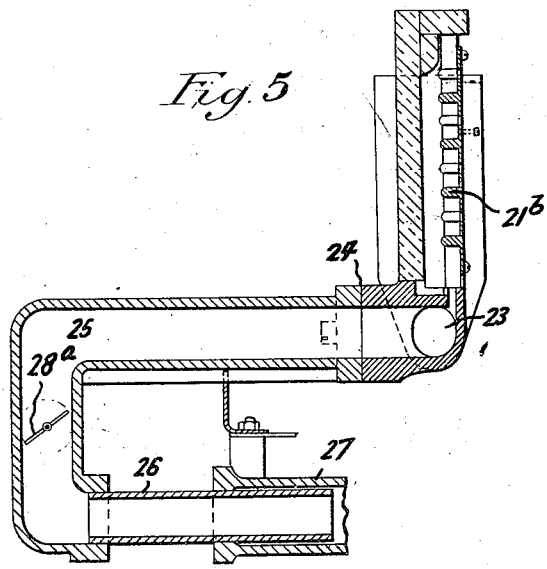
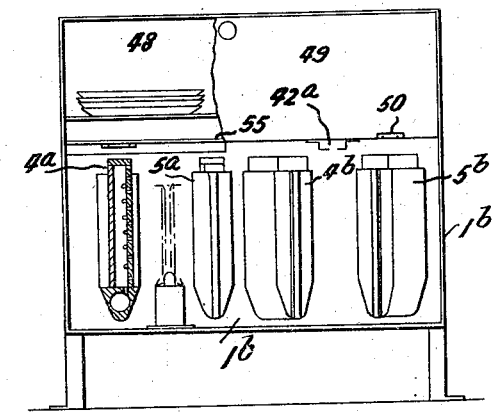
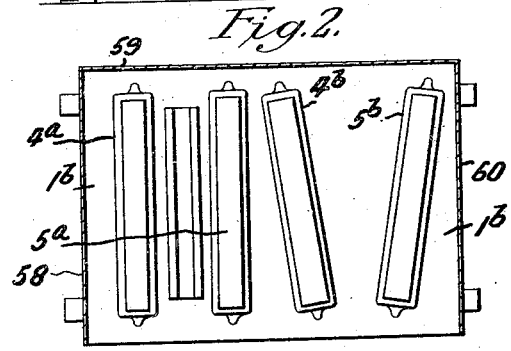
Inventor
William Guy-Pell
By Dowell and Dowell
Attorneys Dec. 14, 1926.
W. GUY-PELL
1,610,370
COOKING APPARATUS
Filed August 8, 1925   3 Sheets-Sheet 2
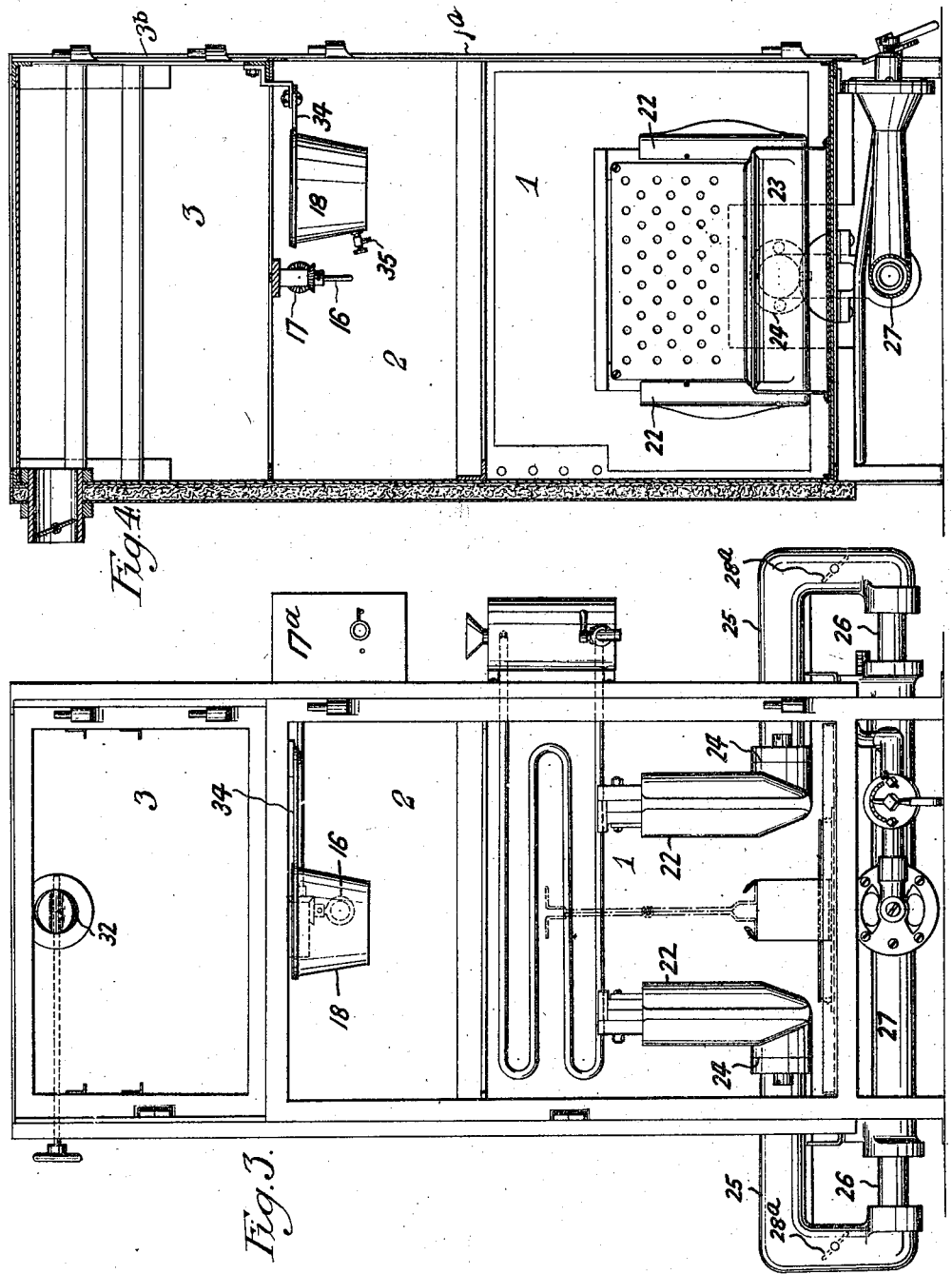
Inventor
William Guy-Pell
By Dowell & Dowell
Attorneys Dec. 14, 1926.　　　　　　　　　　　1,610,370
W. GUY-PELL
COOKING APPARATUS
Filed August 8, 1925　　3 Sheets-Sheet 3

Inventor
William Guy-Pell
By Dowell & Dowell
his Attorneys

Patented Dec. 14, 1926.

1,610,370

UNITED STATES PATENT OFFICE.

WILLIAM GUY-PELL, OF LONDON, ENGLAND.

COOKING APPARATUS.

Application filed August 8, 1925, Serial No. 48,941, and in Great Britain December 9, 1924.

The value of radiant heat for cooking purposes has been long known and it was at one time customary to roast in front of a glowing fire, frequently with the aid of a jack or spit for rotating the joint or the like article of food. The introduction of the close kitchen range in the first place and subsequently of ranges heated by gas, etc., has resulted in this method being practically abolished, food being now generally roasted in an oven where the heat is not transmitted by radiation but by conduction and convection.

So-called "grillers" have been proposed, which make use of vertically arranged and laterally displaced heating elements sometimes mounted on walls of a chamber and capable with the latter of being separated to different extents so as to produce a space of varying size in which the food is suspended or supported so that it is heated simultaneously from opposite sides. Such apparatus, however, as heretofore proposed, have not been in all respects satisfactory.

The object of the present invention is to provide cooking apparatus of this type which is of wider application, more efficient and more compact.

When the heating elements are covered over or boxed-in, there is a tendency, when grilling for example, to cook quicker at the back, which is closed, than at or towards the front which is open. To overcome this difficulty and so secure a more uniform cooking, the heating elements, whilst still disposed vertically, are arranged in inclination to each other instead of being maintained in parallel relation. In other words, the distance separating the heating elements increases toward the back or as the back wall is approached by the extended elements.

Another feature of the present invention, when heating elements adapted to adjustment as to distance between them are to be employed, consists in providing each heating element with a single rigid member movable with such element and directly connected at the other end to the stationary pipe employed to supply the fuel so that the elements may be moved in telescopic fashion.

A still further feature consists in overcoming the drawbacks connected with the heretofore proposed means for the basting of joints, poultry and the like, the basting vessel to this end being mounted in a carrier adapted to enable it to be freely moved into and out of the casing of the apparatus.

The invention also provides for a complete cooker embodying all of the said features combined in a compartmental structure capable of being variously used.

The accompanying drawings illustrate different types of apparatus according to the invention.

In said drawings:

Fig. 1 is a semi-diagrammatic front view, partly in section, of a gas fired oven;

Fig. 2 is a sectional plan view thereof;

Fig. 3 is a front elevation of an adjustable cooking oven;

Fig. 4 is a similar view of said oven on a larger scale but with parts removed;

Fig. 5 is a view showing a part of Fig. 3 in section and on a larger scale; and

Figure 6:
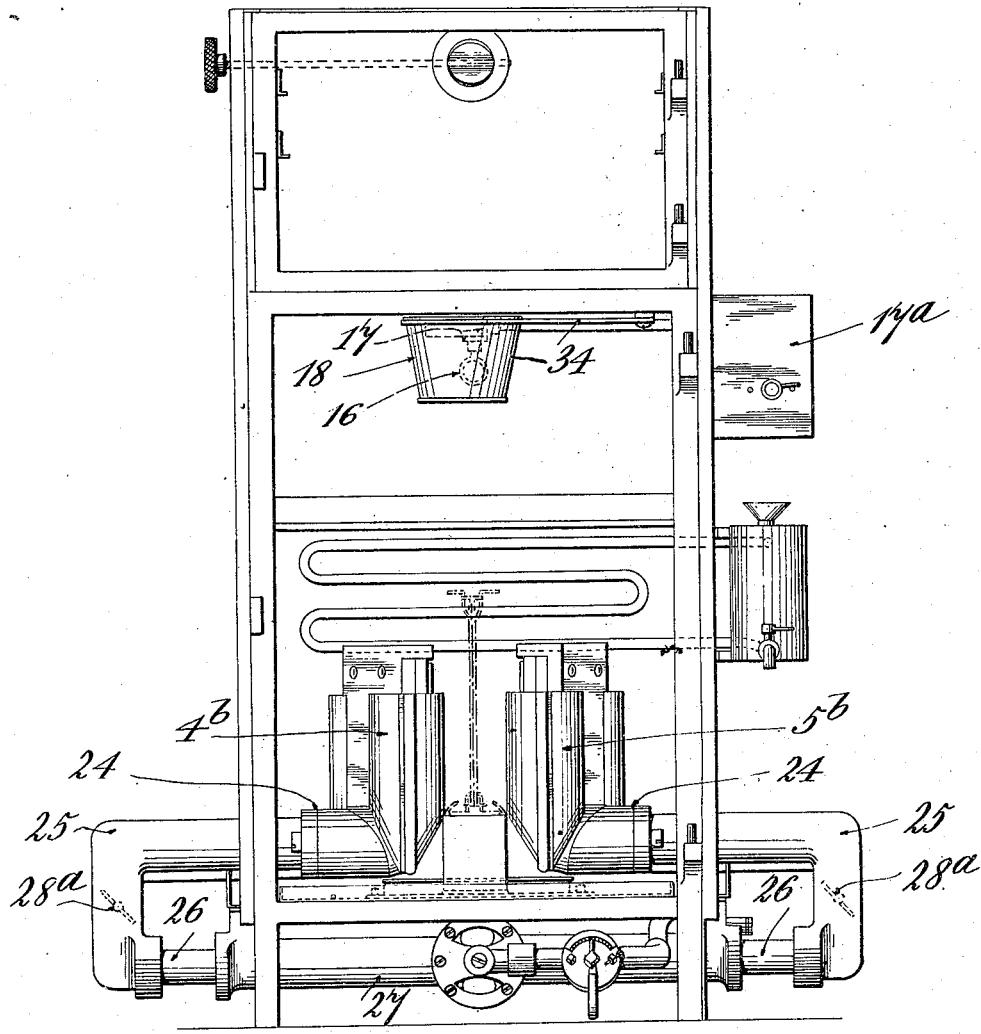
Fig. 6 is a view similar to Fig. 3, of a cooking oven with inclined and adjustable heating elements.

As shown in Figs. 1 and 2, two pairs of gas heated elements $4^a$, $5^a$ and $4^b$, $5^b$ are employed side by side in a compartment $1^b$ which is surmounted by a warming compartment 48 having a turndown front 49 hinged at 50. Each of these pairs of heating elements in this embodiment of the invention is stationary, but the elements $4^b$ $5^b$ (unlike the pair $4^a$ $5^a$ which is parallel to each other), are shown inclined so that the distance separating them increases from the front to the rear. This inclined arrangement is of course not confined to a single pair of heating elements as any number thus arranged may be employed. Between the inclined pair of heating elements $4^b$ $5^b$, runners $42^a$ for supporting food are shown as carried by the top wall 55.

If desired, the compartment for the heating elements may be a mere hood comprising the three walls 58, 59 and 60 with a top 55 and open at the front.

Preferably a stove according to the present invention is, as shown in Figs. 3 and 4, provided with a lower compartment 1, for roasting or grilling and upper compartments 2, 3 the compartment 2 being say for roasting and baking and the compartment 3 for baking, warming and the like. The top of the compartment 3, may serve as a hot plate and for such purpose be provided with a bodily removable cover (not shown). The compartments 1 and 2 may have a common door $1^a$ whilst the compartment 3 has its own door 3b. The food may be either stationary or it may be rotatable; in the latter case a hook or eye 16 in the compartment 2 is rotated by gearing 17 from a clockwork motor 17a located outside the oven. From the said hook or eye, the joint or the like can be hung in any suitable way. 18 is a small vessel arranged in the chamber 2, containing fat for basting the joint and carried by means which render it horizontally movable such for example as a swing arm 34. Said vessel is shown fitted with an adjustable drip outlet in the form of an ordinary cock 35. In this way the vessel can be more readily moved into and out of the casing.

The vertical heating elements, which are denoted by the numeral 22 in Figs. 3 and 4 and by the numerals 4a 5a in Figs. 1 and 2, may be of any suitable type and arranged on any of the well known methods.

Each of the heating elements (shown in Fig. 5 as embodying a burner 23), is connected at 24 to a return tube 25, an extension 26 of which is arranged to fit telescopically within a mixing tube 27. If desired, each tube 25 may be fitted with a valve 28a by which either heating element as a whole may be rendered inoperative.

The gas used may be that known as coal gas, or natural gas, or carburetted air such as is used in petrol motor engines, or otherwise.

The adjustment of the two elements may be done either simultaneously or independently, the elements being unconnected with each other and therefore adapted to move separately.

In Fig. 6 the stove is shown equipped with the inclined heating elements 4b 5b of Fig. 1, which are neither limited as to construction nor to the medium employed to heat them, which may be electric.

What I claim is:—

1. An apparatus for grilling, roasting and like purposes comprising in combination, an enclosure embodying a base portion and a wall portion extending therefrom, a pair of heating elements vertically arranged upon said base portion with edges thereof spaced substantially widely apart adjacent said wall portion and extending laterally therefrom with opposite edges converging toward the front of the enclosure so that the intervening spaces between the heating elements increases as they approach the aforesaid wall portion, whereby the heating effect proceeding from one vertical edge of the elements to the other vertical edge thereof will be equalized, together with means for heating the heating elements.

2. An apparatus for grilling, roasting and like purposes embodying a base portion, a wall portion extending therefrom, heating elements arranged upon said base portion with ends thereof spaced widely apart near said wall portion and laterally extended therefrom with opposite ends converging away from said wall portion so that the intervening space therebetween decreases as they recede from the aforesaid wall portion, thereby equalizing the heating effect proceeding from one vertical edge of the elements to the other vertical edge thereof, together with means for heating the heating elements, substantially as described.

3. An apparatus for grilling, roasting and like purposes comprising a chamber having a base portion, a pair of heating elements movably mounted and arranged over said base portion with edges thereof spaced widely apart adjacent a wall of the chamber and extended laterally therefrom with opposite edges converging toward the front of the chamber, a stationary pipe through which the heating medium to be employed passes, and a rigid member movably associated with each of the heating elements and connected at one end to said stationary pipe through which the heating medium is conducted from the latter to the heating element, substantially as described.

4. An apparatus according to claim 3 in which the stationary pipe is a gas mixing tube and the rigid members movable with the heating elements are adapted to fit telescopically within the mixing tube, substantially as described.

Signed at London, England, this 24th day of July, 1925.

WILLIAM GUY-PELL.